US012149917B2

(12) United States Patent
Vilkamo et al.

(10) Patent No.: US 12,149,917 B2
(45) Date of Patent: Nov. 19, 2024

(54) RECORDING AND RENDERING AUDIO SIGNALS

(71) Applicant: NOKIA TECHNOLOGIES OY, Espoo (FI)

(72) Inventors: Juha Vilkamo, Helsinki (FI); Miikka Vilermo, Siuro (FI); Mikko Tammi, Tampere (FI); Jussi Virolainen, Espoo (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 18/301,792

(22) Filed: Apr. 17, 2023

(65) Prior Publication Data

US 2023/0254659 A1 Aug. 10, 2023

Related U.S. Application Data

(63) Continuation of application No. 16/625,605, filed as application No. PCT/FI2018/050434 on Jun. 11, 2018, now Pat. No. 11,632,643.

(30) Foreign Application Priority Data

Jun. 21, 2017 (GB) ..................................... 1709909

(51) Int. Cl.
*H04S 7/00* (2006.01)
*G10L 19/008* (2013.01)
*G10L 25/00* (2013.01)

(52) U.S. Cl.
CPC .......... *H04S 7/303* (2013.01); *H04S 2400/15* (2013.01); *H04S 2420/11* (2013.01)

(58) Field of Classification Search
USPC ....... 381/1, 17–23, 300, 303, 304, 306, 307, 381/309, 310, 311, 61, 74, 95, 96, 98,
(Continued)

(56) References Cited

U.S. PATENT DOCUMENTS 6,243,476 B1 6/2001 Gardner
7,177,413 B2 2/2007 O'Toole
(Continued)

FOREIGN PATENT DOCUMENTS

EP 2346028 7/2011
EP 3520104 A1 8/2019
(Continued)

OTHER PUBLICATIONS

Advisory Action for U.S. Appl. No. 16/625,605 dated Mar. 7, 2022.
(Continued)

*Primary Examiner* — Qin Zhu
(74) *Attorney, Agent, or Firm* — ALSTON & BIRD LLP

(57) ABSTRACT

A method, apparatus and computer program, the method comprising: receiving a plurality of input signals representing a sound space; using the received plurality of input signals to obtain spatial metadata corresponding to the sound space; using the received plurality of input signals to obtain a first spatial audio signal corresponding to the spatial metadata; and associating the first spatial audio signal with the spatial metadata to enable the spatial metadata to be used to process the first spatial audio signal to obtain a second spatial audio signal.

20 Claims, 7 Drawing Sheets

(58) Field of Classification Search
USPC .................................. 381/104, 122, 370, 124
See application file for complete search history.

(56) References Cited

U.S. PATENT DOCUMENTS

| | | | |
|---|---|---|---|
| 7,876,903 B2 | 1/2011 | Sauk | |
| 9,009,057 B2 | 4/2015 | Breebaart et al. | |
| 9,191,764 B2 | 11/2015 | Baughman et al. | |
| 9,294,862 B2 | 3/2016 | Kim et al. | |
| 9,299,353 B2 | 3/2016 | Sole et al. | |
| 10,803,642 B2 | 10/2020 | DiVerdi et al. | |
| 2003/0035553 A1 | 2/2003 | Baumgarte et al. | |
| 2006/0098830 A1 | 5/2006 | Roeder et al. | |
| 2008/0008342 A1 | 1/2008 | Sauk | |
| 2008/0298610 A1 | 12/2008 | Virolainen et al. | |
| 2009/0043591 A1 | 2/2009 | Breebaart et al. | |
| 2009/0252356 A1 | 10/2009 | Goodwin et al. | |
| 2010/0092014 A1 | 4/2010 | Strauss et al. | |
| 2010/0328419 A1 | 12/2010 | Etter | |
| 2011/0305344 A1 | 12/2011 | Sole et al. | |
| 2013/0016842 A1 | 1/2013 | Schultz-Amling et al. | |
| 2013/0129122 A1* | 5/2013 | Johnson .................... | H04S 1/00 381/306 |
| 2013/0142341 A1 | 6/2013 | Del Galdo et al. | |
| 2013/0148812 A1 | 6/2013 | Corteel et al. | |
| 2014/0016802 A1 | 1/2014 | Sen | |
| 2014/0112480 A1 | 4/2014 | Audfray et al. | |
| 2014/0222439 A1 | 8/2014 | Jung et al. | |
| 2015/0131824 A1 | 5/2015 | Nguyen et al. | |
| 2015/0213807 A1 | 7/2015 | Breebaart et al. | |
| 2015/0358754 A1 | 12/2015 | Koppens et al. | |
| 2016/0037260 A1 | 2/2016 | Faller et al. | |
| 2016/0080886 A1 | 3/2016 | De Bruijn et al. | |
| 2016/0133267 A1 | 5/2016 | Adami et al. | |
| 2016/0225387 A1 | 8/2016 | Koppens et al. | |
| 2016/0227337 A1 | 8/2016 | Goodwin et al. | |
| 2016/0227338 A1 | 8/2016 | Oh et al. | |
| 2016/0241980 A1 | 8/2016 | Najaf-Zadeh et al. | |
| 2017/0140764 A1 | 5/2017 | Wuebbolt et al. | |
| 2017/0180905 A1 | 6/2017 | Purnhagen et al. | |
| 2017/0194014 A1 | 7/2017 | Kim | |
| 2018/0082700 A1 | 3/2018 | Eronen et al. | |
| 2018/0091917 A1 | 3/2018 | Chon et al. | |
| 2018/0091919 A1 | 3/2018 | Chon et al. | |
| 2018/0247656 A1 | 8/2018 | Wuebbolt et al. | |
| 2019/0149940 A1 | 5/2019 | Hayashi et al. | |
| 2019/0373398 A1 | 12/2019 | Breebaart et al. | |
| 2020/0037091 A1 | 1/2020 | Jeon et al. | |
| 2021/0118453 A1 | 4/2021 | Mehta et al. | |
| 2021/0168550 A1 | 6/2021 | Terentiv et al. | |

FOREIGN PATENT DOCUMENTS

| | | |
|---|---|---|
| EP | 3542546 A1 | 9/2019 |
| WO | WO 2012/066183 A1 | 5/2012 |
| WO | WO 2013/024200 A1 | 2/2013 |
| WO | WO 2015/066062 A1 | 5/2015 |
| WO | WO 2016/018787 A1 | 2/2016 |
| WO | WO 2016/033358 A1 | 3/2016 |
| WO | WO 2016/049106 A1 | 3/2016 |
| WO | WO 2017/005978 A1 | 1/2017 |
| WO | WO 2017/085140 A1 | 5/2017 |

OTHER PUBLICATIONS

Advisory Action for U.S. Appl. No. 16/648,324 dated Aug. 17, 2021.
Advisory Action for U.S. Appl. No. 16/648,324 dated Mar. 21, 2022.
Extended European Search Report for European Application No. 18821175.9 dated Feb. 11, 2021, 9 pages.
Extended European Search Report for European Application No. 18863614.6 dated Apr. 20, 2021, 9 pages.
Final Office Action for U.S. Appl. No. 16/625,605 dated Dec. 17, 2021.
Final Office Action for U.S. Appl. No. 16/648,324 dated Aug. 12, 2022.
Final Office Action for U.S. Appl. No. 16/648,324 dated Jan. 25, 2022.
Final Office Action for U.S. Appl. No. 16/648,324 dated May 14, 2021.
International Search Report and Written Opinion for Application No. PCT/FI2018/050434 dated Oct. 17, 2018, 19 pages.
International Search Report and Written Opinion for Application No. PCT/FI2018/050674 dated Dec. 10, 2018, 19 pages.
Jot, J-M. et al., Spatial Audio Scene Coding in a Universal Two-Channel 3-D Stereo Format, Audio Engineering Society Convention Paper 7276 (Oct. 2007) 15 pages.
Kotorynski, K., Digital Binaural/Stereo Conversion and Crosstalk Cancelling, AES Convention 89 (Sep. 1990) 25 pages.
Kowalczyk et al., "Parametric Spatial Sounding Processing: A Flexible and Efficient Solution to Sound Scene Acquisition, Modification, and Reproduction", IEEE Signal Processing Magazine, vol. 32, No. 2, (Mar. 1, 2015), 12 pages.
Laitinen, M-V. et al., Binaural Reproduction For Directional Audio Coding, 2009 IEEE Workshop on Applications of Signal Processing to Audio and Acoustics (Oct. 2009) 337-340.
Myung-Suk et al., "Personal 3D Audio System with Loudspeakers", 2010 IEEE International Conference on Multimedia and Expo, (Jul. 19-23, 2010), 6 pages.
Non-Final Office Action for U.S. Appl. No. 16/625,605 dated Apr. 11, 2022.
Non-Final Office Action for U.S. Appl. No. 16/625,605 dated Aug. 23, 2021.
Non-Final Office Action for U.S. Appl. No. 16/648,324 dated Apr. 11, 2022.
Non-Final Office Action for U.S. Appl. No. 16/648,324 dated Aug. 25, 2021.
Non-Final Office Action for U.S. Appl. No. 16/648,324 dated Feb. 1, 2021.
Notice of Allowance for U.S. Appl. No. 16/625,605 dated Dec. 12, 2022.
Notice of Allowance for U.S. Appl. No. 16/625,605 dated Jul. 27, 2022.
Notice of Allowance for U.S. Appl. No. 16/625,605 dated Mar. 17, 2023.
Office Action for European Application No. 18821175.9 dated Feb. 6, 2023, 7 pages.
Search Report for GB Application No. GB1709909.4 dated Dec. 8, 2017, 6 pages.

* cited by examiner

RECORDING AND RENDERING AUDIO SIGNALS

CROSS-REFERENCE TO RELATED APPLICATIONS

This application is a continuation of U.S. application Ser. No. 16/625,605, filed Dec. 20, 2019, which is a 371 of International Application No. PCT/FI2018/050434, filed Jun. 11, 2018, which claims priority to Great Britain Application No. 1709909.4, filed Jun. 21, 2017, the entire contents of which are incorporated herein by reference.

TECHNOLOGICAL FIELD

Examples of the disclosure relate to recording and rendering audio signals. In particular, they relate to recording and rendering spatial audio signals.

BACKGROUND

Audio capture devices may be used to record a spatial audio signal. The spatial audio signal may comprise a representation of a sound space. The spatial audio signal may then be rendered by an audio rendering device such as headphones or loudspeakers. Any time taken to process the spatial audio signal may lead to delays and buffering in the audio output provided to the user which reduces the quality of the user experience. It is useful to enable recording and rendering of audio signals which provides a high quality user experience.

BRIEF SUMMARY

According to various, but not necessarily all, examples of the disclosure there is provided a method comprising: receiving a plurality of input signals representing a sound space; using the received plurality of input signals to obtain spatial metadata corresponding to the sound space; using the received plurality of input signals to obtain a first spatial audio signal corresponding to the spatial metadata; and associating the first spatial audio signal with the spatial metadata to enable the spatial metadata to be used to process the first spatial audio signal to obtain a second spatial audio signal.

The plurality of input signals may comprise a plurality of microphone signals from a plurality of spatially separated microphones.

The first spatial audio signal may comprise a first binaural audio signal. The second spatial audio signal may comprise a second binaural signal. The second spatial audio signal may be obtained after it has been detected that the sound scene to be rendered has changed The second spatial audio signal may be optimised for rendering via one or more loudspeakers. The second spatial audio signal may comprise Ambisonics.

The method may comprise transmitting the first spatial audio signal and the spatial metadata to a rendering device.

The method may comprise storing the first spatial audio signal with the spatial metadata.

The spatial metadata may comprise information indicating how the energy levels in one or more frequency subbands of the first spatial audio signal have been modified.

According to various, but not necessarily all, examples of the disclosure there is provided an apparatus comprising: processing circuitry; and memory circuitry including computer program code, the memory circuitry and the computer program code configured to, with the processing circuitry, enable the apparatus to: receive a plurality of input signals representing a sound space; use the received plurality of input signals to obtain spatial metadata corresponding to the sound space; use the received plurality of input signals to obtain a first spatial audio signal corresponding to the spatial metadata; and associate the first spatial audio signal with the spatial metadata to enable the spatial metadata to be used to process the first spatial audio signal to obtain a second spatial audio signal.

The plurality of input signals may comprise a plurality of microphone signals from a plurality of spatially separated microphones.

The first spatial audio signal may comprise a first binaural audio signal. The second spatial audio signal may comprise a second binaural signal. The second spatial audio signal may be obtained after it has been detected that a sound scene to be rendered has changed.

The second spatial audio signal may be optimised for rendering via one or more loudspeakers. The second spatial audio signal may comprise Ambisonics.

The memory circuitry and the computer program code may be configured to, with the processing circuitry, enable the apparatus to transmit the first spatial audio signal and the spatial metadata to a rendering device.

The memory circuitry and the computer program code may be configured to, with the processing circuitry, enable the apparatus to store the first spatial audio signal with the spatial metadata.

The spatial metadata may comprise information indicating how the energy levels in one or more frequency subbands of the first spatial audio signal have been modified.

According to various, but not necessarily all, examples of the disclosure there is provided an apparatus comprising: means for receiving a plurality of input signals representing a sound space; using the received plurality of input signals to obtain spatial metadata corresponding to the sound space; means for using the received plurality of input signals to obtain a first spatial audio signal corresponding to the spatial metadata; and means for associating the first spatial audio signal with the spatial metadata to enable the spatial metadata to be used to process the first spatial audio signal to obtain a second spatial audio signal.

According to various, but not necessarily all, examples of the disclosure there is provided an apparatus comprising: means for performing any of the methods described above.

According to various, but not necessarily all, examples of the disclosure there may be provided an audio capture device comprising an apparatus as described above and a plurality of microphones.

The audio capture device may comprise an image capture device.

According to various, but not necessarily all, examples of the disclosure there is provided a computer program comprising computer program instructions that, when executed by processing circuitry, enable: receiving a plurality of input signals representing a sound space; using the received plurality of input signals to obtain spatial metadata corresponding to the sound space; using the received plurality of input signals to obtain a first spatial audio signal corresponding to the spatial metadata; and associating the first spatial audio signal with the spatial metadata to enable the spatial metadata to be used to process the first spatial audio signal to obtain a second spatial audio signal.

According to various, but not necessarily all, examples of the disclosure there is provided a computer program comprising program instructions for causing a computer to perform any of the methods described above.

According to various, but not necessarily all, examples of the disclosure there is provided a method comprising: receiving a first spatial audio signal and spatial metadata corresponding to the first spatial audio signal wherein the first spatial audio signal and the spatial metadata have been obtained from a plurality of input signals representing a sound space; and enabling rendering of an audio signal in either a first rendering mode or a second rendering mode wherein in the first rendering mode the first spatial audio signal is rendered to a user and in the second rendering mode the spatial metadata is used to process the first spatial audio signal to obtain a second different spatial audio signal and the second spatial audio signal is rendered to a user.

The first spatial audio signal may comprise a first binaural audio signal. The second spatial audio signal may comprise a second binaural signal. The second spatial audio signal may be obtained after it has been detected that the user has rotated their head.

The second spatial audio signal may be optimised for rendering via one or more loudspeakers.

The spatial metadata may comprise information indicating how the energy levels in one or more frequency sub-bands of the first spatial audio signal have been modified.

The rendering mode that is used may depend on the type of rendering device being used.

The rendering mode that is used may depend on the available processing capability.

According to various, but not necessarily all, examples of the disclosure there is provided an apparatus comprising: processing circuitry; and memory circuitry including computer program code, the memory circuitry and the computer program code configured to, with the processing circuitry, enable the apparatus to: receive a first spatial audio signal and spatial metadata corresponding to the first spatial audio signal wherein the first spatial audio signal and the spatial metadata have been obtained from a plurality of input signals representing a sound space; and enable rendering of an audio signal in either a first rendering mode or a second rendering mode wherein in the first rendering mode the first spatial audio signal is rendered to a user and in the second rendering mode the spatial metadata is used to process the first spatial audio signal to obtain a second different spatial audio signal and the second spatial audio signal is rendered to a user.

The first spatial audio signal may comprise a first binaural audio signal. The second spatial audio signal may comprise a second binaural signal. The second spatial audio signal may be obtained after it has been detected that the user has rotated their head.

The second spatial audio signal may be optimised for rendering via one or more loudspeakers.

The spatial metadata may comprise information indicating how the energy levels in one or more frequency sub-bands of the first spatial audio signal have been modified.

The rendering mode that is used may depend on the type of rendering device being used.

The rendering mode that is used may depend on the available processing capability.

According to various, but not necessarily all, examples of the disclosure there is provided an apparatus comprising: means for receiving a first spatial audio signal and spatial metadata corresponding to the first spatial audio signal wherein the first spatial audio signal and the spatial metadata have been obtained from a plurality of input signals representing a sound space; and means for enabling rendering of an audio signal in either a first rendering mode or a second rendering mode wherein in the first rendering mode the first spatial audio signal is rendered to a user and in the second rendering mode the spatial metadata is used to process the first spatial audio signal to obtain a second different spatial audio signal and the second spatial audio signal is rendered to a user.

According to various, but not necessarily all, examples of the disclosure there is provided an apparatus comprising: means for performing any of the methods described above.

According to various, but not necessarily all, examples of the disclosure there is provided an audio rendering device comprising an apparatus as described above and at least one audio output device.

According to various, but not necessarily all, examples of the disclosure there is provided a computer program comprising computer program instructions that, when executed by processing circuitry, enable: receiving a first spatial audio signal and spatial metadata corresponding to the first spatial audio signal wherein the first spatial audio signal and the spatial metadata have been obtained from a plurality of microphone signals from a plurality of spatially separated microphones; and enabling rendering of an audio signal in either a first rendering mode or a second rendering mode wherein in the first rendering mode the first spatial audio signal is rendered to a user and in the second rendering mode the spatial metadata is used to process the first spatial audio signal to obtain a second different spatial audio signal and the second spatial audio signal is rendered to a user.

According to various, but not necessarily all, examples of the disclosure there is provided a computer program comprising program instructions for causing a computer to perform any of the methods described above.

According to various, but not necessarily all, examples of the disclosure there is provided a system comprising an audio capture device as described above and an audio rendering device as described above.

BRIEF DESCRIPTION

For a better understanding of various examples that are useful for understanding the detailed description, reference will now be made by way of example only to the accompanying drawings in which.

DEFINITIONS

Figure 1:
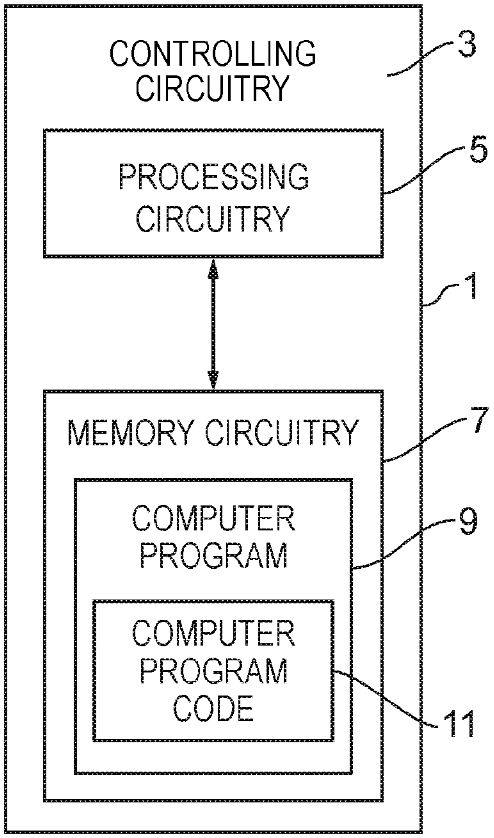
FIG. 1 illustrates an apparatus.

A sound space refers to an arrangement of sound sources in a three-dimensional space. A sound space may be defined in relation to recording sounds (a recorded sound space) and in relation to rendering sounds (a rendered sound space). The rendered sound space may enable a user to perceive the arrangement of the sound sources as though they have been recreated in a virtual three-dimensional space. The rendered sound space therefore provides a virtual space that enables a user to perceive spatial sound.

A sound scene refers to a representation of the sound space listened to from a particular point of view within the sound space. For example a user may hear different sound scenes as they rotate their head or make other movements which may change their orientation within a sound space.

A sound object refers to a sound source that may be located within the sound space. A source sound object represents a sound source within the sound space. A recorded sound object represents sounds recorded at a particular microphone or position. A rendered sound object represents sounds rendered from a particular position.

DETAILED DESCRIPTION

The Figures illustrate, apparatus 1, methods and devices 23, 25 which may be used for audio capture and audio rendering. In particular the apparatus 1, methods and devices 23, 25 enable spatial audio that has been captured by an audio capture device 23 to be rendered by different audio rendering devices 25. Different audio rendering devices 25 may require different types of spatial audio signal in order to provide a high quality output for the user. For instance an audio rendering device 25 comprising headphones requires a different spatial audio signal to an audio rendering device 25 comprising loudspeakers. Also where a user is using headphones the spatial audio signal required may depend on the orientation of the user and any rotation of their head. In examples of the disclosure the audio signal can be captured in a first spatial format and then, if needed, converted into a second spatial format by using associated metadata.

Figure 2:
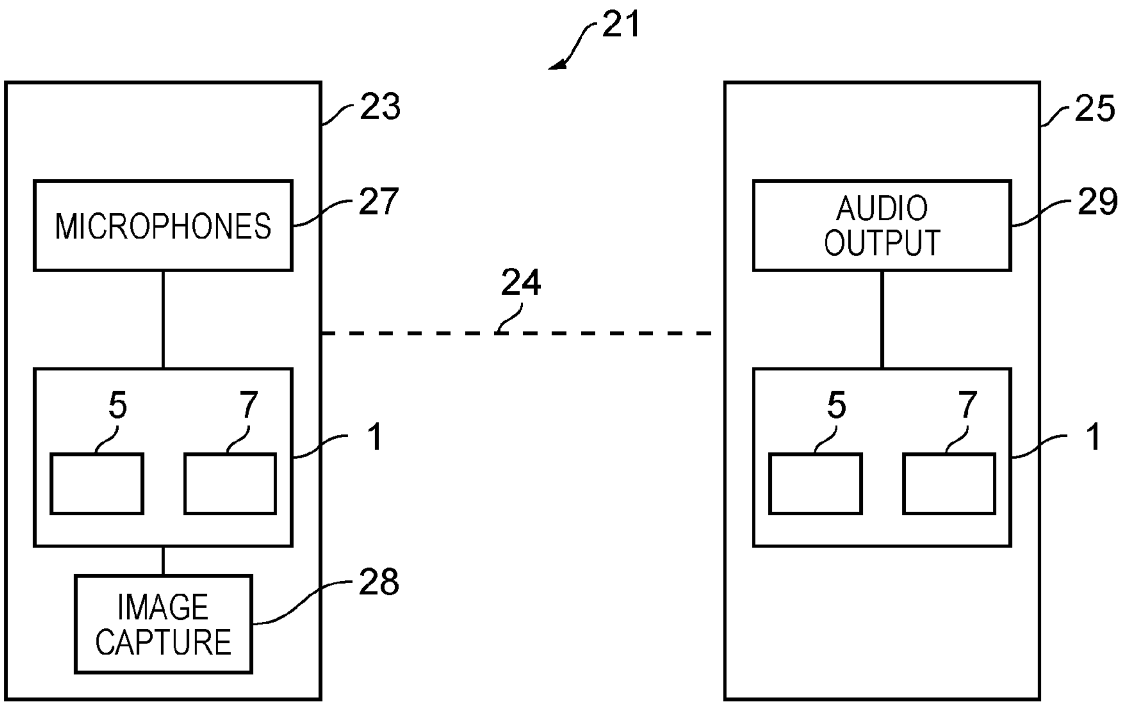
FIG. 2 illustrates a system comprising an audio capture device and an audio rendering device.

FIG. 1 schematically illustrates an apparatus 1 according to examples of the disclosure. The apparatus 1 illustrated in FIG. 1 may be a chip or a chip-set. In some examples the apparatus 1 may be provided within devices such as audio capture devices 23 and/or audio rendering devices 25. Examples of audio capture devices 23 and audio rendering devices 25 are shown in FIG. 2.

The apparatus 1 comprises controlling circuitry 3. The controlling circuitry 3 may provide means for controlling an electronic device 21. The controlling circuitry 3 may also provide means for performing the methods or at least part of the methods of examples of the disclosure.

The apparatus 1 comprises processing circuitry 5 and memory circuitry 7. The processing circuitry 5 may be configured to read from and write to the memory circuitry 7. The processing circuitry 5 may comprise one or more processors. The processing circuitry 5 may also comprise an output interface via which data and/or commands are output by the processing circuitry 5 and an input interface via which data and/or commands are input to the processing circuitry 5.

The memory circuitry 7 may be configured to store a computer program 9 comprising computer program instructions (computer program code 11) that controls the operation of the apparatus 1 when loaded into processing circuitry 5. The computer program instructions, of the computer program 9, provide the logic and routines that enable the apparatus 1 to perform the example methods illustrated in FIGS. 3 to 9. The processing circuitry 5 by reading the memory circuitry 7 is able to load and execute the computer program 9.

The computer program 9 may arrive at the apparatus 1 via any suitable delivery mechanism. The delivery mechanism may be, for example, a non-transitory computer-readable storage medium, a computer program product, a memory device, a record medium such as a compact disc read-only memory (CD-ROM) or digital versatile disc (DVD), or an article of manufacture that tangibly embodies the computer program. The delivery mechanism may be a signal configured to reliably transfer the computer program 9. The apparatus may propagate or transmit the computer program 9 as a computer data signal. In some examples the computer program code 11 may be transmitted to the apparatus 1 using a wireless protocol such as Bluetooth, Bluetooth Low Energy, Bluetooth Smart, 6LoWPan (IPv6 over low power personal area networks) ZigBee, ANT+, near field communication (NFC), Radio frequency identification, wireless local area network (wireless LAN) or any other suitable protocol.

Although the memory circuitry 7 is illustrated as a single component in the figures it is to be appreciated that it may be implemented as one or more separate components some or all of which may be integrated/removable and/or may provide permanent/semi-permanent/dynamic/cached storage.

Although the processing circuitry 5 is illustrated as a single component in the figures it is to be appreciated that it may be implemented as one or more separate components some or all of which may be integrated/removable.

References to "computer-readable storage medium", "computer program product", "tangibly embodied computer program" etc. or a "controller", "computer", "processor" etc. should be understood to encompass not only computers having different architectures such as single/multi-processor architectures, Reduced Instruction Set Computing (RISC) and sequential (Von Neumann)/parallel architectures but also specialized circuits such as field-programmable gate arrays (FPGA), application-specific integrated circuits (ASIC), signal processing devices and other processing circuitry. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

As used in this application, the term "circuitry" refers to all of the following:

(a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of "circuitry" applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in a server, a cellular network device, or other network device.

FIG. 2 schematically illustrates a system 21 comprising an audio capture device 23 and one or more audio rendering devices 25. In the system 21 of FIG. 2 one audio rendering device 25 is shown. It is to be appreciated that any number of audio rendering devices 25 may be provided in various implementations of the disclosure. In some examples the audio capture device 23 and the audio rendering device 25 may be provided as a single device. The devices 23, 25 could be mobile phones or any other suitable type of devices.

The audio capture device 23 comprises an apparatus 1 and a plurality of microphones 27. The apparatus 1 may comprise processing circuitry 5 and memory circuitry 7 as described above.

The plurality of microphones 27 may be arranged to enable a spatial audio signal to be obtained. The plurality of microphones 27 comprises any means which enables an audio signal to be converted into an electrical signal. The plurality of microphones 27 may comprise any suitable type of microphones. In some examples the plurality of microphones 27 may comprise digital microphones. In some examples the plurality of microphones 27 may comprise analogue microphones. In some examples the plurality of microphones 27 may comprise an electret condenser microphone (ECM), a micro electro mechanical system (MEMS) microphone or any other suitable type of microphone.

The plurality of microphones 27 may be spatially distributed within the audio capture device 23 so as to enable a spatial audio signal to be obtained by the apparatus 1. For instance where the audio capture device 23 is a mobile telephone two or more microphones 27 may be provided at different positions on the front of the mobile telephone and one or more microphones 27 may be provided on the rear of the mobile telephone. Alternatively the mobile phone could comprise a first microphone on a side of the phone, a second microphone adjacent to a front facing camera and a third microphone adjacent to an earpiece. Other arrangements of the microphones 27 may be used in other examples of the disclosure.

The plurality of microphones 27 are coupled to the apparatus 1 so that the microphone signals detected by the plurality of microphones 27 are provided to the apparatus 1. The processing circuitry 5 of the apparatus 1 may be arranged to process the microphone signals detected by the plurality of microphones 27. The apparatus 1 may be arranged to use the plurality of microphone signals to obtain spatial audio signals. The spatial audio signals may comprise any signals which enable a sound space to be rendered for a user.

The processing circuitry 5 of the apparatus 1 may also be arranged to use the received plurality of microphone signals to obtain spatial metadata relating to the obtained spatial audio signals. The spatial metadata may comprise information relating to the sound space and sound scenes within the sound space. The spatial metadata may comprise information that enables the sound space to be reproduced as a rendered sound space so that the user perceives the spatial properties of the recorded sound space. For example the spatial metadata may enable the sound sources to be reproduced at positions corresponding to the recorded sound scene. The spatial metadata may also enable the directionality and the ambience within the sound scenes to be reproduced within a rendered sound space.

The obtained spatial audio signals and the corresponding spatial metadata may be stored in the memory circuitry 7. In some examples the spatial audio signals and the corresponding spatial metadata may be transmitted to one or more audio rendering devices 25. The spatial audio signals and the corresponding spatial metadata may be transmitted via any suitable communication link 24. The communication link 24 could be a wireless or wired communication link.

In the example of FIG. 2 the audio capture device 23 also comprises an image capture device 28. The image capture device 28 comprises any means which may be arranged to capture images corresponding to the captured audio. The image capture device 28 may be arranged to capture images for use in virtual or augmented reality applications, or for any other suitable application.

The audio rendering device 25 comprises an apparatus 1 and at least one audio output device 29. The apparatus 1 may be as described above.

The audio output device 29 may comprise any means which may be arranged to convert an input electrical signal to an audible output signal. Different audio rendering devices 25 may comprise different audio output devices 29. For example some audio rendering devices 25 may comprise headphones which may be arranged to be worn adjacent to the user's ears. If a user is wearing headphones the audio output may need to be updated when the user rotates their head. Other audio rendering devices 25 could comprise loudspeakers or any other suitable audio output devices 29 which enable a sound space to be rendered to a user.

The audio output device 29 is coupled to the apparatus 1 so that the audio output device 29 is arranged to render a spatial audio signal provided by the apparatus 1.

The apparatus 1 in the audio rendering devices 25 is arranged to receive the spatial audio signal and the spatial metadata from the audio capture device 23. The apparatus 1 may receive the spatial audio signal and the spatial metadata via the communication link 24. The apparatus 1 may then enable rendering of the audio signal in a preferred format. The preferred format may be determined by factors such as the type of audio output device 29 available, the processing capabilities available, the orientation of a user within a sound space and any other suitable factors.

Figure 3:
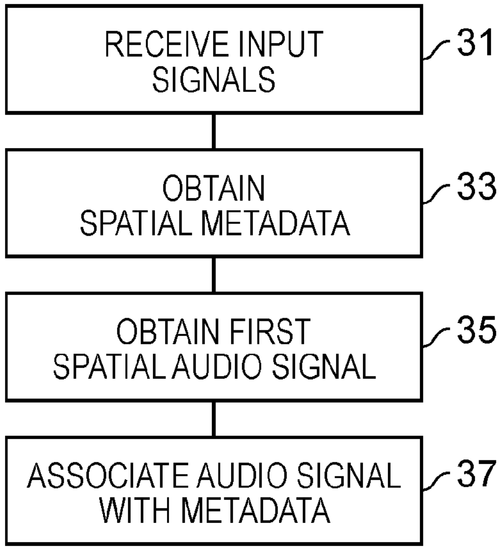
FIG. 3 illustrates a method of capturing spatial audio signals.

FIG. 3 illustrates an example method of capturing spatial audio signals. The method of FIG. 3 could be implemented by an apparatus 1 within an audio capture device 23 as described above.

The method comprises, at block 31, receiving a plurality of input signals representing a sound space. The plurality of input signals may spatially sample a sound field. The plurality of input signals may comprise a plurality of microphone signals from a plurality of spatially separated microphones 27. The microphones 27 may be spatially separated to enable a sound space to be recorded. The microphone signals could therefore enable a sound space to be rendered so that a user perceives the spatial properties of the sound sources within the sound space.

At block 33 the method comprises using the received plurality of microphone signals to obtain spatial metadata. The spatial metadata may correspond to the sound space. Any suitable parametric spatial audio capture method may be used to obtain the spatial metadata. In some examples the spatial metadata may be determined by analysing the plurality of input signals. In some examples the spatial metadata may be determined by analysing frequency bands of the plurality of input signals. In such examples the controlling circuitry 3 transforms the input signals into the frequency domain before the spatial metadata is determined.

The spatial metadata comprises information relating to the spatial properties of the sound space recorded by the microphones. The spatial metadata may comprise information relating to the sound space and sound scenes within the sound space. The spatial metadata may comprise information that enables the sound space to be reproduced as a rendered sound space so that the user perceives the spatial properties of the recorded sound space.

In some examples of the disclosure the spatial metadata may comprise information that enables the plurality of input signals to be converted to one or more spatial audio signals. In such cases the spatial metadata may comprise information relating to the spatial properties of the sound that would be perceived by the user. In such cases the spatial metadata does not need to comprise information relating to the whole of the sound space. The spatial metadata may comprise information about the perceptually relevant properties of the sound space. The spatial metadata combined with the audio data may enable the rendering of the sound space such that the spatial properties can be perceived.

In examples of the disclosure the spatial metadata may comprise information which enables any spatial processing that is applied to the first spatial audio signal to be reverted. For instance the spatial metadata may comprise information indicating how the energy levels in one or more frequency sub-bands of the first spatial audio signal have been modified.

At block 35 the method comprises using the received plurality of microphone signals to obtain a first spatial audio signal. The apparatus 1 may apply spatial processing to the received plurality of input signals to obtain the first spatial audio signal. The spatial processing that is applied may depend on the type of spatial audio signal that is to be obtained. The first spatial audio signal may correspond to the spatial metadata in that the spatial metadata comprises information relating to the spatial properties of the first spatial audio signal.

In some examples the first spatial audio signal may be obtained by processing the frequency domain signals obtained by the controlling circuitry at block 33 according to the spatial metadata. This may enable a binaural audio signal, or any other suitable type, of audio signal to be obtained.

The first spatial audio signal may comprise any signal which enables the sound space to be rendered to a user. In some examples the first spatial audio signal may comprise a binaural audio signal. The binaural audio signal may be optimised for playback via headphones that are positioned adjacent to the user's ears. The binaural audio signal may be obtained using any suitable method. In some examples the binaural signal may be synthesized in frequency bands using the obtained spatial metadata. In such examples the spatial metadata comprises information such as the directions or direct-to-total energy ratios for each of the frequency bands in the signal. This information is used to process the microphone signals to provide a binaural audio signal that has spatial properties corresponding to the spatial metadata. The processing of the microphone signals may comprise adjusting the energies, phase differences, level differences and coherences in each of the frequency bands for one or more pairs of microphone signals.

The first spatial audio signal could comprise other types of spatial audio signals in other examples of the disclosure. For example the spatial audio signals could comprise stereo audio signals, Ambisonic signals, Dolby 5.1 or any other suitable spatial audio signals.

At block 37 the method comprises associating the first spatial audio signal with the spatial metadata. The associating enables the spatial metadata to be used to process the first spatial audio signal to obtain a second spatial audio signal. The spatial metadata may be used to revert the spatial processing that was applied to obtain the first spatial audio signal. The reversion may enable the signal to be reprocessed to a different type of audio signal. For instance it may enable a binaural audio signal to be reprocessed into an audio signal for a loudspeaker or to a different type of binaural audio signal without inheriting the spatial properties of the first audio signal. In some examples the reversion may retain some of the spatial properties of the first audio signal, for instance, some phase difference could be retained while changes that have been effected in the energy spectrum could be removed.

In some examples the associating of the first spatial audio signal and the spatial metadata may comprise storing the first spatial audio signal and the spatial metadata in the memory circuitry 7. This may enable the spatial metadata to be retrieved and used to process the first spatial audio signal as required.

In some examples the associating of the first spatial audio signal and the spatial metadata may comprise embedding the spatial metadata within the spatial audio signal.

In some examples the first spatial audio signal and the spatial metadata may be transmitted to another apparatus 1. For instance the first spatial audio signal and the spatial metadata could be transmitted from the audio capture device 23 to an audio rendering device 25. The spatial metadata may be embedded within the first spatial audio signal. This may enable the audio rendering device 25 to either render the first spatial audio signal as received or to further process the received spatial audio signal to obtain a second spatial audio signal. The spatial audio signal and the spatial metadata may be encoded before they are transmitted. Any suitable means may be used to encode the spatial audio signal and the spatial metadata. For example AAC may be used to encode the spatial audio signal.

Figure 4:
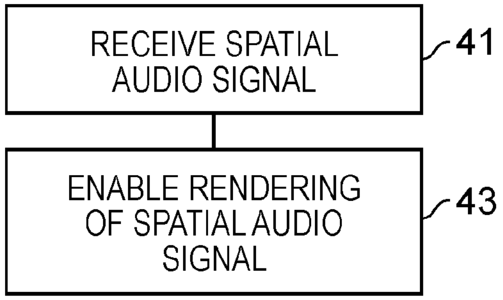
FIG. 4 illustrates a method of rendering spatial audio signals.

FIG. 4 illustrates an example method of rendering spatial audio signals. The method of FIG. 4 could be implemented by the apparatus 1 within the audio rendering device 25 as described above.

At block 41 the method comprises receiving a first spatial audio signal and spatial metadata corresponding to the first spatial audio signal wherein the first spatial audio signal and the spatial metadata have been obtained from a plurality of microphone signals from a plurality of spatially separated microphones 27. The first spatial audio signal and spatial metadata may be received from an audio capture device 23. The first spatial audio signal and spatial metadata may be decoded as required.

At block 43 the method comprises enabling rendering of an audio signal in either a first rendering mode or a second rendering mode.

In the first rendering mode the first spatial audio signal is rendered to a user. The rendering may comprise reproducing the sound scenes from the sound space so that they are audible to a user. In this mode the spatial metadata is not needed and may be discarded by the apparatus 1. The first spatial audio signal may be rendered as it was received without any further processing.

In some examples the rendering could comprise transmitting the spatial audio signal to another device. For instance the spatial audio could be uploaded to a network such as the internet or could be shared to another device. In such cases the spatial metadata could be discarded and only the spatial audio signal needs to be further transmitted.

The first rendering mode may be suitable if the first spatial audio signal is already optimised for the type of audio output device 29 in the audio rendering device 25. For instance where the first spatial audio signal is a binaural signal and the audio rendering device 25 comprises headphones the first rendering mode may be used. This reduces the amount of processing that is required to be performed by the audio rendering device 25 and may provide an improved audio experience for the user.

The first rendering mode could also be used in audio rendering devices 25 which do not have processing capacity or capability to use the spatial metadata. This may ensure that the first spatial audio signals could be rendered on any available audio rendering device 25.

In the second rendering mode further processing is performed on the first spatial audio signal before it is rendered to the user. The spatial metadata is used to process the first spatial audio signal to obtain a second different spatial audio signal so that the second spatial audio signal is rendered to a user instead of the first spatial audio signal. In the second rendering mode the spatial metadata may be separated from the first spatial audio signal and then used to further process the first spatial audio signal.

The second rendering mode may be suitable if the first spatial audio signal is not optimised for the type of audio output device 29 available the audio rendering device 25. For instance where the first spatial audio signal is a binaural signal and the audio rendering device comprises loudspeakers. In such cases the spatial metadata may be used to process the first spatial audio signal into a second spatial audio signal which is optimised for the loudspeakers such as a 5.1 output.

The second rendering mode may also be suitable if the user's orientation within a sound space has changed. For instance, if a user is wearing headphones the sound scene that they should hear will change if they rotate their head. This rotation requires a different binaural audio signal to be provided so that the user hears the correct sound scene. In such cases the spatial metadata can be used to compensate for the spatial processing that was applied to create the first binaural signal and then used to apply further spatial processing to create a new binaural signal.

In some cases the second rendering mode could be used to provide a personalised output for a user. For instance if the first spatial output is a binaural output and the audio rendering device 25 comprises headphones, the apparatus 1 could use the spatial metadata to enable an audio output which is personalised to the user to be rendered.

Figure 5:
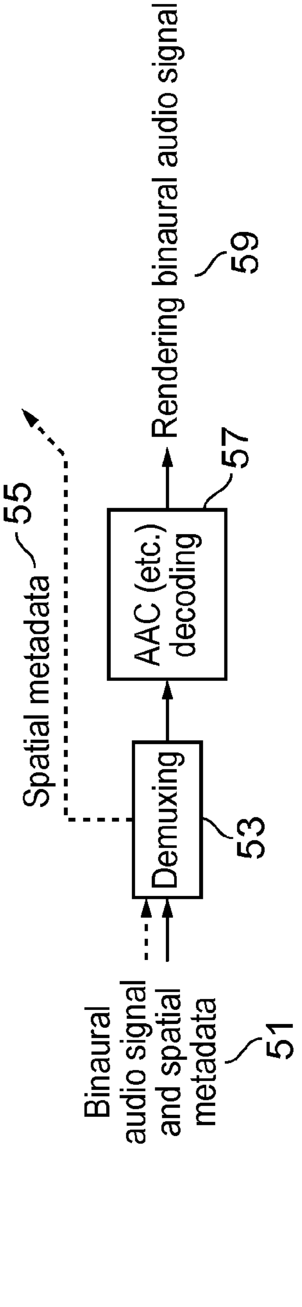
FIG. 5 illustrates a method of rendering spatial audio signals in a first rendering mode.

FIG. 5 illustrates an example method which may be implemented by an audio rendering device 25 operating in a first rendering mode. In this example method the first spatial audio signal comprises a binaural audio signal.

At block 51 the binaural audio signal and associated spatial metadata are received. At block 53 the received signal is demultiplexed to separate the spatial metadata from the binaural audio signal.

At block 55 the spatial metadata is discarded. The spatial metadata is not used for any further processing of the binaural audio signal in the first rendering mode.

The binaural audio signal is provided from the demultiplexer to a decoder and at block 57 the binaural audio signal is decoded. At block 59 the binaural audio signal is rendered to the user via the audio output device 29. The audio output device could be headphones or any other suitable audio output device.

In the example of FIG. 5 no further spatial processing is carried out on the binaural audio signal after it has been received. The binaural audio signal is rendered in the same format as it is encoded and transmitted by the audio capture device 23. This rendering mode could be used where the audio output device 25 also comprises head phones so that the binaural audio signal is already optimized for rendering by the headphones. This reduces the processing required to be carried out by the rendering device 25 and may provide for an improved user experience.

In other cases this rendering mode could be used by audio output devices which do not have processing capabilities to further spatially process the received binaural audio signal. This may enable the spatial audio to be rendered by any rendering device 25.

Figure 6:
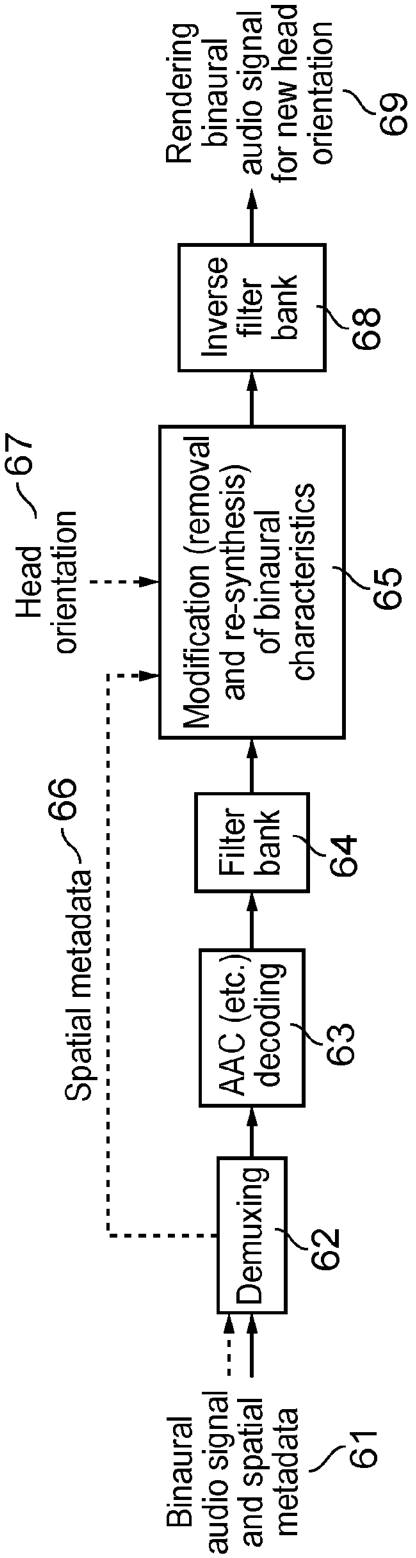
FIG. 6 illustrates a method of rendering spatial audio signals in a second rendering mode.

FIG. 6 illustrates an example method which may be implemented by an audio rendering device 25 operating in a second rendering mode. In this example method the first spatial audio signal comprises a binaural audio signal and it is determined that a user has rotated their head within the sound space so that a different binaural audio signal needs to be rendered to the user corresponding to the new head orientation of the user.

At block 61 the binaural audio signal and associated spatial metadata are received and at block 62 the received signal is demulitplexed to separate the spatial metadata from the binaural audio signal.

The binaural audio signal is provided from the demultiplexer to a decoder and at block 63 the binaural audio signal is decoded. In the example of FIG. 6 the binaural audio signal is decoded into a pulse code modulated (PCM) signal. At block 64 the PCM signal is transformed into frequency bands using a filter bank. The filter bank used to transform the PCM signal could be a short-time Fourier transform (STFT), a complex-modulated quadrature mirror filter (QMF) bank or any other suitable type of filter bank.

At block 65 further processing of the binaural audio signal is performed. In order to enable the further processing of the binaural audio signal the spatial metadata is provided at block 66. The spatial metadata may be provided from the demultiplexer to the processing circuitry 5 of the audio rendering device 25.

The spatial metadata comprises information relating to the spatial properties of the sound space recorded by the microphones. The spatial metadata also comprises information which indicates how the originally captured microphone signals have been modified by the spatial processing which formed the binaural audio signal. In order to obtain the binaural audio signal the captured microphone signals have been spatially processed. This spatial processing has modified the microphone signals so as to amplify some frequencies and attenuate others, to adjust phase differences level differences and coherences in at least some of the frequency bands or to make any other suitable modifications. For example, if there was a sound source located in front of the plurality of microphones, the frequencies are amplified and attenuated to correspond to the shoulder and pinna reflections of a user hearing the sound source located in front of their head. As the user rotates their head the spatial properties according to the HRTFs used to provide the spatial audio signal to the user need to be replaced with spatial properties according to the HRTFs which represent the new angular orientation.

In the example of FIG. 6 the further processing of the binaural audio signal is performed because it is detected that the sound scene that is to be rendered has changed. In the example of FIG. 6 the sound scene that is to be rendered has changed because the user has rotated their head. In some examples the sound scene to be rendered could be changed in response to a user making a user input which may cause the rotation of the sound space. For instance a user may make a mouse input or a gesture input which could cause a displayed scene and the corresponding audio scene to be rotated.

At block 67 information indicative of the orientation of the user's head is received. The information indicative of the orientation of the user's head could be obtained from any suitable means such as accelerometers or other head tracking devices.

The further processing of the binaural audio signal comprises the modification of the binaural characteristics of the binaural audio signal. In the example of FIG. 6 this comprises using the spatial metadata to revert the characteristics of the first binaural audio signal as received and apply new characteristics corresponding to the user's new head orientation. For instance the spatial properties according to the HRTFs used to obtain the first spatial audio signal are removed and replaced with spatial properties according to the HRTFs corresponding to the position of the sound sources relative to the user.

At block 68 the further processed binaural audio signal is provided to an inverse filter bank and transformed to a PCM signal. At block 69 the PCM signal is rendered to the user via the audio output device 29. The audio output device could be headphones or any other suitable audio output device. In the example of FIG. 6 the further processing updates the audio scene that is rendered to the user to match the user's new head orientation. This provides a good user experience as the rendered audio can be matched to the user's head orientation as needed.

In the example of FIG. 6 the further processing of the audio enables an updated binaural audio signal to be provided to take into account the rotation of the user's head. In other examples the further processing could be used to create a binaural audio signal that is personalized to the user of the audio rendering device 25. In such examples the HRTFs that are applied in block 65 may be personalized to the user of the audio rendering device 25.

In other examples the further processing could be used to create a different type of spatial audio signal. For instance the binaural audio signal could be received by the audio rendering device 25. However the audio output devices 29 of the audio rendering device 25 may comprise a loudspeaker rather than headphones. In such cases the binaural audio signal could be further processed into a stereo audio signal. The stereo audio signal could be optimized for the loudspeaker arrangement of the audio output device 25. Different audio output devices 25 may use types of signals such as 5.1, Ambisonics or other suitable signals.

The methods of FIGS. 5 and 6 could be implemented by any suitable rendering device 25. The same rendering device 25 could operate in different modes of operation so that at some times the rendering device 25 renders audio signals according to the method of FIG. 5 and at other times the rendering device 25 renders audio signals according to the method of FIG. 6. The rendering device 25 could switch between the different modes of operation as needed. For instance the rendering device 25 could begin by rendering audio signals according to FIG. 5. The rendering device 25 could then detect that the user has rotated their head and, in response to detecting the head rotation, the rendering device could switch to a mode of operation using the method of FIG. 6.

Figure 7:
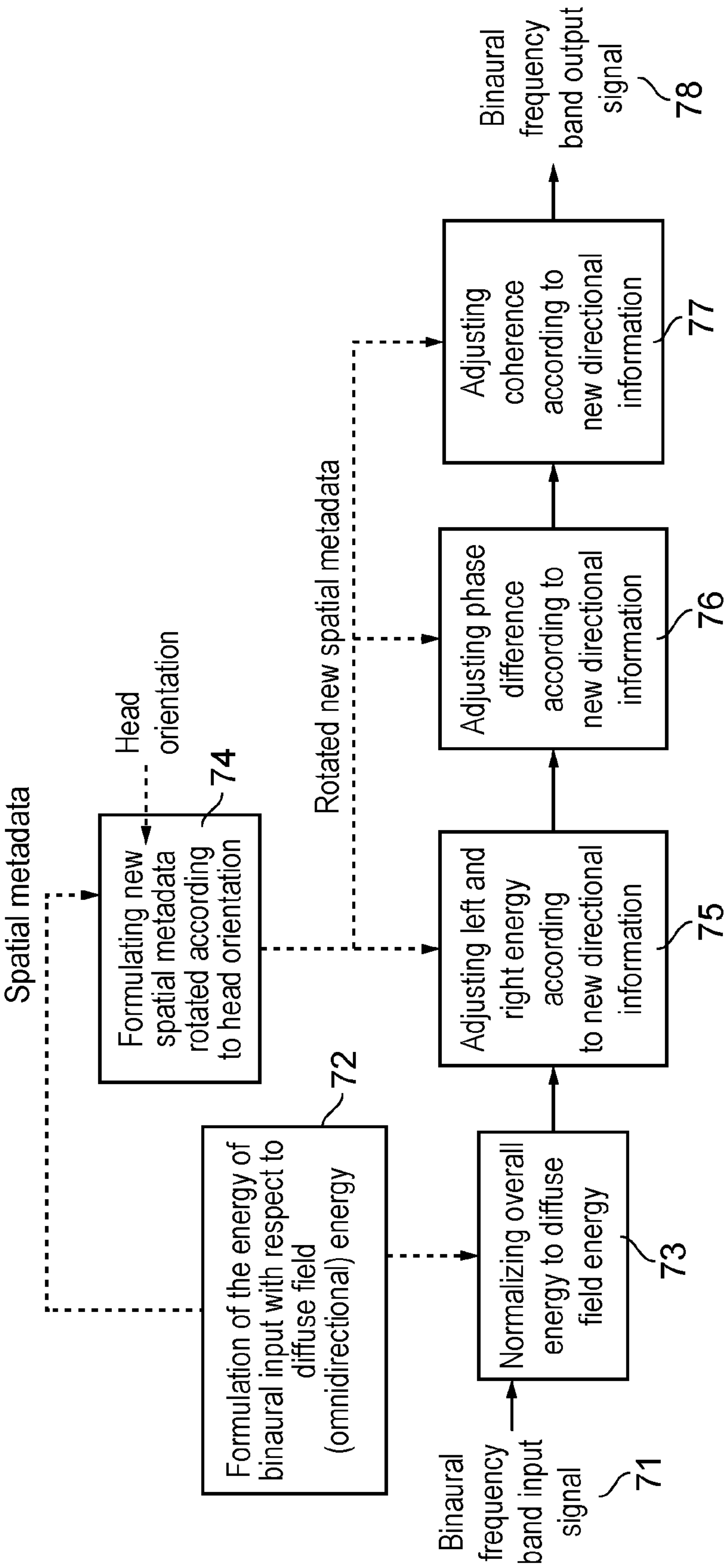
FIG. 7 illustrates a method of further processing spatial audio signals.

FIG. 7 illustrates an example method of further processing the first spatial audio signal. The method of FIG. 7 could be performed at block 65 in the method of FIG. 6. The method of FIG. 7 enables the spatial audio signal to be updated when a user changes their head orientation.

At block 71 the input signal is received. In the example of FIG. 7 the input signal comprises frequency bands of the binaural audio signal which are obtained by the filter bank. The frequency bands have been adjusted from the captured microphone signals so that some of the frequency bands have been amplified and/or attenuated. Other properties of the frequency bands, such as phase difference, level differences, coherence, may also have been adjusted.

At block 72 the spatial metadata is used to identify how the frequency bands have been amplified and/or attenuated. The spatial metadata enables the energy of the binaural input in frequency bands with respect to energy of the diffuse field to be formulated. The diffuse field may provide a default value that indicates how the spatial processing has affected the energy levels in respective frequency bands. Other spectrums could be used in other implementations of the disclosure.

The spatial metadata may comprise any suitable information. In some examples the spatial metadata may comprise a direction-of-arrival and a direct-to-total energy ratio parameter determined for each time interval and for each frequency interval within the binaural audio signal. Other information may be provided in other examples. The processing that is applied to the binaural audio signal may be determined by the information that is comprised within the spatial metadata.

At block 73 at least some of the spatial processing that has been applied to the binaural audio signal by the audio capture device 23 is removed. In the example of FIG. 7 the binaural frequency band input signal is normalized to the diffuse field energy. The energy levels which are obtained at block 72 are used to normalize the binaural frequency band input signal.

At block 74 new spatial metadata is formulated. The new spatial metadata may correspond to a new head orientation of the user. The spatial metadata that was provided with the binaural audio signal and information indicative of the user's head orientation are used to formulate the new spatial metadata. For example if the user's head has been rotated 30° to the left the new spatial metadata is formulated by rotating the directional information within the previous spatial metadata 30° to the right.

At block 75 the rotated new spatial metadata is used to adjust the left and right energies and other properties of the binaural audio signal to correspond to the new head orientation of the user. If the user has rotated their head 30° to the left then a sound source which was previously located in front of the user is now located 30° to the right in terms of the inter-aural level difference. The energies and other properties of the left and right signals of the binaural audio signal are adjusted using the HRTFs corresponding to that direction. The adjustment of the energy levels and other properties may take into account the proportion of the direct and ambience energy in the frequency bands of the binaural audio signal.

At block 76 the rotated new spatial metadata is used to adjust the phase difference of the right and left signals of the binaural audio signal to correspond to the user's new head orientation. The phase difference could be adjusted using any suitable method. In some examples the phase difference may be adjusted by measuring the phase difference between the right and left signals and applying complex multipliers to the frequency bands of the right and left signals so as to obtain the intended phase difference.

At block 77 the rotated new spatial metadata is used to adjust the coherence of the right and left signals of the binaural audio signal to correspond to the user's new head orientation. The coherence could be adjusted using any suitable method. In some examples the coherence could be adjusted by applying de-correlating signal processing operations to the left and right signals. In some examples the left and right signals could be mixed adaptively to obtain a new coherence.

At block 78 the binaural frequency band output signal is provided. The binaural frequency band output signal now corresponds to the new head orientation of the user. The binaural frequency band output signal can be provided to an inverse filter bank and then rendered by an audio output device 29 such as headphones.

In the example of FIG. 7 the same HRTFs are applied at both the encoder and decoder stage. In some examples of the disclosure different HRTFs could be applied. In such examples the decoder in the audio rendering device 25 may comprise two or more sets of HRTFs. One of the HRTF sets could match the set used in the encoder at the audio capturing device 23 and one or more of the HRTF sets could be personalized for a user of the audio rendering device 25. The personalized HRTF set could provide a better audio output for the user than a generic HRTF set. In such examples the further processing of the binaural audio signal may comprise using the HRTF set of the encoder to compensate for the spatial processing of the binaural audio signal. For instance the HRTF set can be used to normalize the binaural audio signal. The personalized HRTF set could then be used to provide the new spatial audio signal. For instance the personalized HRTF set could be used to adjust the energy, phase and coherence of the binaural audio signal.

Figure 8:
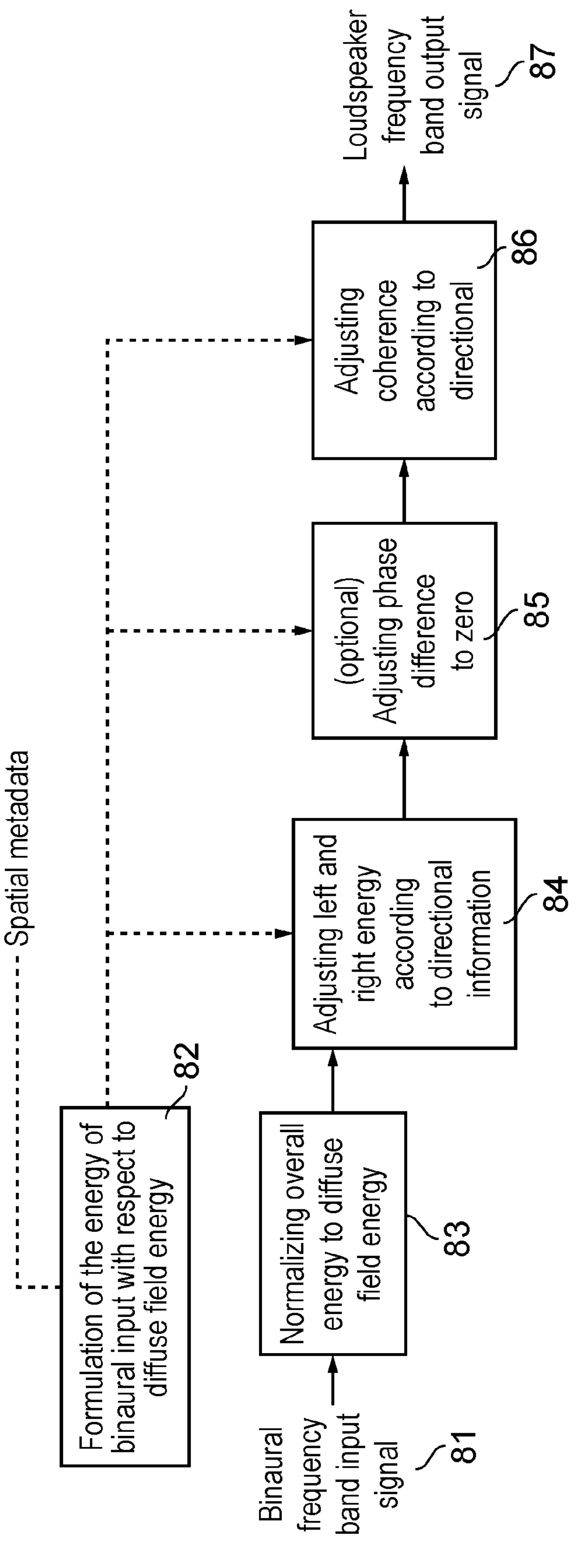
FIG. 8 illustrates a method of further processing spatial audio signals.

FIG. 8 illustrates another example method of further processing the first spatial audio signal. The method of FIG. 8 could also be performed at block 65 in the method of FIG. 6. The method of FIG. 8 enables the binaural audio signal to be updated to a different type of spatial audio signal. The different type of spatial audio signal could be optimized for rendering by a different type audio output device 29 such as loudspeakers.

At block 81 the input signal is received. In the example of FIG. 7 the input signal comprises frequency bands of the binaural audio signal which are obtained by the filter bank. The frequency bands have been adjusted from the captured microphone signals so that some of the frequency bands have been amplified and/or attenuated. The binaural audio signal may have been optimized for rendering via headphones. It is to be appreciated that, as described previously, other processing will have been performed on the input signal.

At block 82 the spatial metadata is used to identify how the frequency bands have been amplified and/or attenuated. The spatial metadata enables the energy of the binaural input with respect to the energy of a default field such as the diffuse field to be formulated. The spatial metadata may comprise any suitable information as described above.

At block 83 the spatial processing that has been applied to the binaural audio signal by the audio capture device 23 is compensated for. In the example of FIG. 8 the binaural frequency band input signal is normalized to the diffuse field energy. The energy levels which are obtained at block 82 are used to normalize the binaural frequency band input signal.

At block 84 the spatial metadata is used to adjust the left and right energies of the binaural audio signal. The left and right energies can be adjusted using an amplitude panning function in accordance with the spatial metadata. The adjustment of the left and right energies may also take into account the amount of non-directional energy in the binaural audio signal.

At block 85 the spatial metadata is used to adjust the phase difference of the right and left signals of the binaural audio signal. In some examples the phase difference could be adjusted to zero as the phase differences in the binaural audio signal might not be relevant when the audio rendering device 25 comprises a loudspeaker.

At block 86 the spatial metadata is used to adjust the coherence of the right and left signals of the binaural audio signal. The coherence could be adjusted so that energy corresponding to direct sound sources is coherent while energy corresponding to ambient sounds is incoherent.

At block 87 the loudspeaker frequency band output signal is provided. The loudspeaker frequency band output signal can be provided to an inverse filter bank and then rendered by an audio output device 29 comprising a loudspeaker.

In the example of FIGS. 7 and 8 the respective blocks of the methods have been illustrated as separate blocks. It is to be appreciated that these blocks may represent the conceptual blocks of the processing and that in implementations of the disclosure some of the blocks may be combined into a single block. This may enable some of the spatial characteristics of the input signal to be removed and the spatial characteristics of the new signal to be applied in a signal block. For example, an equalization system does not need to invert a spectrum (defined by a gain A) by an inversion gain 1/A, and then after that synthesize a desired spectrum (defined by gain B) by multiplying the spectrum by B. Instead, the spectrum can be directly multiplied by a gain value B/A to obtain a desired output.

It is also to be appreciated that some of the blocks of FIGS. 7 and 8 could be omitted in some implementations of the disclosure. For instance, if the left signal and right signal are highly incoherent then the phase difference is not significant. In such cases, where the impact of the inherited binaural phase difference is not significant, the adjusting of the phase difference, at blocks 76 and 85, could be omitted.

In other examples the blocks of estimating the spatial processing that has been applied to the binaural audio signal could be omitted. For instance in some examples the spatial metadata may comprise equalization metadata which can be used to invert the spectrum of the binaural audio signal to a diffuse field equalized spectrum or any other suitable spectrum. In such cases blocks 72 and 82 would not be needed as the information is already available in the spatial metadata.

Figure 9:
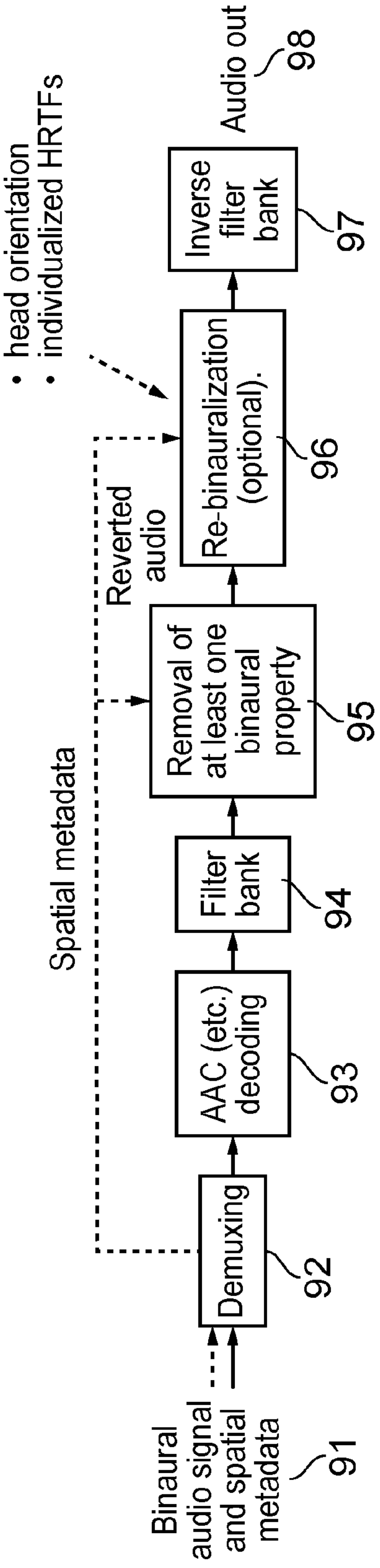
FIG. 9 illustrates another method of rendering spatial audio signals in a second rendering mode.

FIG. 9 illustrates another example method which may be implemented by an audio rendering device 25 operating in a second rendering mode. In this example method the first spatial audio signal comprises a binaural audio signal and the second spatial audio signal that is output by the method also comprises a binaural audio signal. The method of FIG. 9 could be used if a user has rotated their head or if personalized HRTFs are available, for example. In the example of FIG. 9 the removal of the spatial processing and the applying of new spatial properties are performed as two separate blocks.

At block 91 the binaural audio signal and associated spatial metadata are received and at block 92 the received signal is demultiplexed to separate the spatial metadata from the binaural audio signal.

The binaural audio signal is provided from the demultiplexer to a decoder and at block 93 the binaural audio signal is decoded. In the example of FIG. 9 the binaural audio signal is decoded into a pulse code modulated (PCM) signal. At block 94 the PCM signal is transformed into frequency bands using a filter bank. Any suitable type of filter bank may be used as described above.

At block 95 at least some of the spatial processing that has been applied to the binaural audio signal by the audio capture device 23 is compensated for. In the example of FIG. 9 at least one binaural property of the binaural audio signal may be removed. The spatial metadata is used to remove the spatial processing. The spatial metadata may be provided from the demultiplexer to the processing circuitry 5 of the audio rendering device 25 to enable the spatial processing to be removed.

The binaural properties that are compensated for at block 95 may comprise properties such as Inter-Channel Time Difference/Inter-Channel Phase Difference (ICTD/ICPD), Inter Channel Level Difference (ICLD), Inter Channel Coherence (ICC), amplitude as a function of frequency, energy as a function of frequency or any other suitable properties.

Any suitable processes can be used to remove the binaural properties. For example the ICTD can be removed using the spatial metadata and the current measured time difference. If the spatial metadata indicates that the sound source is located to the right of the user then this may indicate that the audio capturing device 23 applied a delay of approximately 0.5 ms to the left channel compared to the right channel. The ICTD can be removed by the audio rendering device 25 delaying the right channel by 0.5 ms. In some examples the time differences could be converted in to frequency domain phase differences. In such examples the removal of the phase difference could be performed separately for different frequency bands.

In some examples the ICLD may be removed by removing the level difference that was added in the audio capturing device 23. In some examples the pan law based level difference for loudspeakers may be applied instead.

The modification of the energy/amplitude as a function of frequency could be reverted by multiplying the binaural frequency band audio signal by a gain factor in accordance with the spatial metadata.

The coherence could be removed by using mixing and/or decorrelation operations.

At block 96 further spatial processing is applied to the audio signal. The spatial metadata is used for the further spatial processing. In the example of FIG. 9 the audio signal is processed into a new binaural audio signal. Additional information such as the user's head orientation or the personalized HRTFs could also be used for the further spatial processing.

Any suitable processing could be applied to the audio signal at block 9 for example the processing could comprise adding reverb, compensating for room effects, allowing Doppler effects or and other processes. As the processing is carried out on a signal which has had the binaural properties removed this may provide for a higher quality audio output than is the processing was carried out on the binaural signal.

At block 97 the further processed binaural audio signal is provided to an inverse filter bank and transformed to a PCM signal. At block 98 the PCM signal is rendered to the user via the audio output device 29. The audio output device could be headphones or any other suitable audio output device.

The term "comprise" is used in this document with an inclusive not an exclusive meaning. That is any reference to X comprising Y indicates that X may comprise only one Y or may comprise more than one Y. If it is intended to use "comprise" with an exclusive meaning then it will be made clear in the context by referring to "comprising only one . . . " or by using "consisting".

In this brief description, reference has been made to various examples. The description of features or functions in relation to an example indicates that those features or functions are present in that example. The use of the term "example" or "for example" or "may" in the text denotes, whether explicitly stated or not, that such features or functions are present in at least the described example, whether described as an example or not, and that they can be, but are not necessarily, present in some of or all other examples. Thus "example", "for example" or "may" refers to a particular instance in a class of examples. A property of the instance can be a property of only that instance or a property of the class or a property of a sub-class of the class that includes some but not all of the instances in the class. It is therefore implicitly disclosed that a feature described with reference to one example but not with reference to another example, can where possible be used in that other example but does not necessarily have to be used in that other example.

Although embodiments of the present invention have been described in the preceding paragraphs with reference to various examples, it should be appreciated that modifications to the examples given can be made without departing from the scope of the invention as claimed.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

We claim:

1. A method comprising:

receiving a plurality of microphone signals representing a sound space from a plurality of spatially separated microphones;

analyzing the received plurality of microphone signals to obtain spatial metadata corresponding to the sound space; and processing the received plurality of microphone signals to obtain a first spatial audio signal, wherein the first spatial audio signal is configured to be used in both a first rendering mode associated with a playback device in a first orientation and a second rendering mode associated with the playback device after having moved to a second orientation, different than the first orientation, and wherein in the first rendering mode the spatial metadata is discarded and in the second rendering mode the spatial metadata is configured to be used to process the first spatial audio signal to obtain a second spatial audio signal.

2. The method as claimed in claim 1, wherein the first spatial audio signal comprises a first binaural audio signal and the second spatial audio signal comprises a second binaural audio signal.

3. The method as claimed in claim 1, further comprising transmitting the first spatial audio signal and the spatial metadata to a rendering device.

4. The method as claimed in claim 1, further comprising storing the first spatial audio signal with the spatial metadata.

5. The method as claimed in claim 1, wherein the spatial metadata comprises information indicating how energy levels in one or more frequency sub-bands of the first spatial audio signal have been modified.

6. The method as claimed in claim 1, wherein the second spatial audio signal comprises at least one of: Ambisonics signals or 5.1 signals.

7. An apparatus comprising:

processing circuitry; and memory circuitry including computer program code, the memory circuitry and the computer program code configured to, with the processing circuitry, enable the apparatus to:

receive a plurality of microphone signals representing a sound space from a plurality of spatially separated microphones;

analyze the received plurality of microphone signals to obtain spatial metadata corresponding to the sound space; and process the received plurality of microphone signals to obtain a first spatial audio signal, wherein the first spatial audio signal is configured to be used in both a first rendering mode associated with a playback device in a first orientation and a second rendering mode associated with the playback device after having moved to a second orientation, different than the first orientation, and wherein in the first rendering mode the spatial metadata is discarded and in the second rendering mode the spatial metadata is configured to be used to process the first spatial audio signal to obtain a second spatial audio signal.

8. The apparatus as claimed in claim 7, wherein the first spatial audio signal comprises a first binaural audio signal and the second spatial audio signal comprises a second binaural audio signal.

9. The apparatus as claimed in claim 7, wherein the memory circuitry and the computer program code are configured to, with the processing circuitry, enable the apparatus to transmit the first spatial audio signal and the spatial metadata to a rendering device.

10. The apparatus as claimed in claim 7, wherein the memory circuitry and the computer program code are configured to, with the processing circuitry, enable the apparatus to store the first spatial audio signal with the spatial metadata.

11. The apparatus as claimed in claim 7, wherein the spatial metadata comprises information indicating how energy levels in one or more frequency sub-bands of the first spatial audio signal have been modified.

12. The apparatus as claimed in claim 7, wherein the second spatial audio signal comprises at least one of: Ambisonics signals or 5.1 signals.

13. A method comprising:

receiving a first spatial audio signal and spatial metadata corresponding to the first spatial audio signal, wherein the first spatial audio signal and the spatial metadata have been obtained from a plurality of microphone signals received from a plurality of spatially separated microphones, and wherein the plurality of microphone signals represent a sound space; and enabling rendering of an audio signal in either a first rendering mode associated with a playback device in a first orientation or a second rendering mode associated with the playback device after having moved to a second orientation, different than the first orientation, wherein in the first rendering mode the spatial metadata is discarded, and in the second rendering mode, a second spatial audio signal that is obtained based at least in part on processing the first spatial audio signal using the spatial metadata is rendered.

14. The method as claimed in claim 13, wherein:

in the first rendering mode, the first spatial audio signal is rendered without considering information indicative of an orientation of a user's head, and in the second rendering mode, the second spatial audio signal that is obtained is also based at least in part on processing the first spatial audio signal using information indicative of an orientation of the user's head.

15. The method as claimed in claim 13, further comprising receiving information indicative of an orientation of a user's head from a head tracking device from which to determine the first and second orientations of the playback device.

16. The method as claimed in claim 15, further comprising switching from the first rendering mode to the second rendering mode in response to detecting rotation of the user's head.

17. An apparatus comprising:

processing circuitry; and memory circuitry including computer program code, the memory circuitry and the computer program code configured to, with the processing circuitry, enable the apparatus to:

receive a first spatial audio signal and spatial metadata corresponding to the first spatial audio signal, wherein the first spatial audio signal and the spatial metadata have been obtained from a plurality of microphone signals received from a plurality of spatially separated microphones, and wherein the plurality of microphone signals represent a sound space; and enable rendering of an audio signal in either a first rendering mode associated with a playback device in a first orientation or a second rendering mode associated with the playback device after having moved to a second orientation, different than the first orientation, wherein in the first rendering mode the spatial metadata is discarded, and in the second rendering mode, a second spatial audio signal that is obtained based at least in part on processing the first spatial audio signal using the spatial metadata is rendered.

18. The apparatus as claimed in claim 17, wherein:

in the first rendering mode, the first spatial audio signal is rendered without considering of information indicative of an orientation of a user's head, and in the second rendering mode, the second spatial audio signal that is obtained is also based at least in part on processing the first spatial audio signal using information indicative of an orientation of the user's head.

19. The apparatus as claimed in claim 17, wherein the memory circuitry and the computer program code are further configured to, with the processing circuitry, enable the apparatus to receive information indicative of an orientation of a user's head from a head tracking device from which to determine the first and second orientations of the playback device.

20. The apparatus as claimed in claim 19, wherein the memory circuitry and the computer program code are further configured to, with the processing circuitry, enable the apparatus to switch from the first rendering mode to the second rendering mode in response to detecting rotation of the user's head.

* * * * *